2,889,277

METHOD OF INHIBITING CORROSION OF METALS

William B. Hughes, Tulsa, Okla., assignor to Cities Service Research and Development Company, New York, N.Y., a corporation of New Jersey No Drawing. Application November 16, 1955
Serial No. 547,341

14 Claims. (Cl. 252—8.55)

This invention relates to new compositions of matter and more particularly with improved compositions and processes for inhibiting corrosion of metals.

It is generally recognized that oil-producing formations often yield with the crude oil brine which is extremely corrosive in its action upon the oil-producing and collecting equipment, including the metal tubing, casings, pumps, pipe lines, and storage equipment. This type of corrosion is particularly noticeable in wells producing brine which contain varying amounts of hydrogen sulfide, carbon dioxide, and other acidic materials therein. Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide improved corrosion inhibiting compounds having structures which make them uniquely effective in minimizng and reducng corrosion in wells producing oil-brine mixtures, and particularly reducing corrosion in wells in which large amounts of brine are produced as compared to oil.

I have discovered that the compositions of my invention which comprise substituted triazine compounds prepared according to the method hereafter described possess uniquely effective corrosion inhibiting properties. The basic reaction utilized has been described by Tollens (Ber., 17, 657, 1884) and by Pratesi (GA22, chim ital., 14, 352, 1884). It is described in Walker's Formaldehyde, page 203. The triazine compounds of my invention are prepared by first reacting three mols of aniline or a substituted aniline compound, preferably an alkyl substituent, with three mols of a formaldehyde to provide an intermediate reaction product. The intermediate reaction product is obtained by removing from the reaction zone three mols of water. Water produced during the reaction of the amine and formaldehyde is removed as a benzene-water azeotrope. To obtain the triazine compound which I have found to be unexpectedly effective corrosion inhibitors, the intermediate reaction product is further reacted with from one to three mols of an acid, preferably one selected from the group comprising oleic acid, stearic acid, ricinoleic acid, and green acids. The intermediate product used in my invention has the formula:

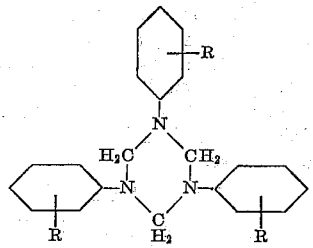

in which R is hydrogen or an alkyl substituent on the original aniline ring.

In preparing the compositions used in my invention the selected aniline compound, preferably an alkyl aniline having from one to about 15 carbon atoms in the alkyl chain, is added to formaldehyde with gentle heating until the vigorous reaction is completed. A small amount of toluene or other azeotrope-forming solvent is added so that water liberated in the reaction of the amine group and the formaldehyde may be removed from the reaction mixture. Generally the reaction period will vary from one to about six hours and can be carried out at a temperature of from about 80° C. to about 100° C. After removal of that amount of water, which is an amount equivalent to one mol based on the reaction of one mol of the aniline compound with one mol of the formaldehyde, the toluene used in forming the toluene-water azeotrope is removed by distillation. The final reaction product is then washed and dried and added to the corrosive fluids as hereinafter described.

While I have found that the reaction proceeds satisfactorily with formaldehyde when using low molecular weight aniline compounds, more satisfactory results and shorter reaction times will be obtained if PARA formaldehyde (alpha polyoxymethylene) is used. The green acids utilized in preparing the desired reaction products are those obtainable from the sulfonation of an aromatic petroleum stock. The particular green acids used in my work had an average molecular weight of about 301. The name "green acids," used to characterize a number of compounds of this type, is to be contrasted with the insoluble sulfonates used in lubricating oils and often referred to as "mahogany acids." The green acid terminology may be derived in part from the characteristics of sulfonate sludge which provides an almost green solution in water. A more complete description of green acids will be found in U. S. 2,226,121, De Groote, December 24, 1940.

In order to more fully understand the nature of the compositions utilized in my invention and the manner in which their preparation is carred out, as well as their unique effectiveness in inhibiting corrosion, the following examples and table are provided:

EXAMPLE 1

To 260 grams (1 mol) of $C_{12}$ alkylaniline which boils at 295–345° C., 30.3 grams (1 mol) of alpha polyoxymethylene (99% HCHO) was added cautiously and the mixture heated gently until signs of vigorous reaction were completed. Fifty ml. of toluene was then added and the mixture heated under a water-trap condenser to distill the water-toluene azeotrope with toluene being continuously returned through the still-head to the reaction mixture. After six and one-half hours, 17.6 grams of water had been collected indicating a 90% complete reaction. Toluene was then removed by distillation and molecular weight determinations made according to the method of Rast (Ber., 55, 1051, 3727, 1922). The intermediate product was found to have a molecular weight value of 836. To 83.0 grams (0.1 mol) of the intermediate product 84.0 grams (0.3 mol) of oleic acid were added with stirring to form the oleate salt of the substituted triazine.

EXAMPLE 2

To 83.0 grams (0.1 mol) of the intermediate product obtained according to Example 1 above, 90.0 grams (0.3 mol) of a water-soluble sulfonated hydrocarbon cut commonly known as "green acids" were added with mixing to form a salt. The product of this reaction was tested as a corrosion inhibitor and is identified as inhibitor No. 9 in the table which follows.

EXAMPLE 3

To 161 grams (1 mol) of $C_5$ alkylaniline 30.3 grams (1 mol) of alpha polyoxymethylene (99% formaldehyde) were added cautiously and the mixture heated gently until signs of vigorous reaction were completed. Fifty ml. of toluene were then added and the mixture heated under a water-trap condenser to distill the water-toluene azeotrope with toluene being returned continuously through the stillhead to the reaction mixture. After a six-hour reaction period, about 17.5 grams of water was collected indicating substantially complete reaction of the aniline and aldehyde compounds. The azeotrope former toluene was then removed by distillation and molecular weight determinations made according to the method of Rast. The product hereafter referred to as the intermediate product was found to have a molecular weight of about 830 as compared to the theoretical molecular weight of 836. To 83.0 grams (0.1 mol) of the intermediate product 18.8 grams of oleic acid were added with stirring to form an oleate salt. This product is identified as inhibitor No. 12 in the table which follows.

EXAMPLE 4

Following the procedure set forth in Example 3 above 86.4 grams of stearic acid was added to 83.0 grams (0.1 mol) of the intermediate product with stirring to form the stearate salt. This product was tested as a corrosion inhibitor and is identified as inhibitor No. 14 in the table which follows.

EXAMPLE 5

To 83 grams (0.1 mol) of the intermediate product obtained according to Example 3, 49.6 grams of ricinoleic acid were reacted according to the method described in Example 3 to provide an acid salt identified as inhibitor No. 15 in the table which follows.

EXAMPLE 6

To 93 grams of aniline (1 mol) 89 grams of 37% formaldehyde (1 mol) was cautiously added with agitation and allowed to stand with temperature control until a heavy precipitate formed. The product of anhydroformaldehyde aniline upon recrystallization from alcohol amounted to 141.6 grams and had a melting point of 140–141° C. The 141.6 grams represents a yield of 94.5%. To 31.5 grams of the intermediate product anhydroformaldehyde aniline, 67.6 grams (0.2 mol) of propylated naphthalene sulfonic acid prepared according to the directions of Walker, U.S. 1,873,165 were added with mixing to produce the sulfonic acid salt. The final product was tested as a corrosion inhibitor according to the test method hereafter described and is identified in the table which follows as inhibitor No. 1.

EXAMPLE 7

Following the method outlined in Example 6 above, 56 grams (0.2 mol) of oleic acid were added with mixing to 31.5 grams (0.1 mol) of the intermediate anhydroformaldehyde aniline product to form an oleate salt. This product was tested as a corrosion inhibitor and is identified as inhibitor No. 2 in the table which follows.

The effectiveness of the compounds described above in reducing the corrosiveness of oil field brine may be more fully understood by reference to certain tests which I have conducted, using prepared brines to substantially duplicate well conditions. The test procedure involved a measurement of the corrosive action of the hypothetical well fluid as inhibited with compositions described above upon weighed, cleaned, and polished strips of number 18 gauge cold-rolled steel measuring one-quarter inch by four inches, under conditions closely approximating those existing in a producing well and a comparison thereof with the results obtained by subjecting identical strips to the corrosive action of my hypothetical well fluid without inhibitor added.

The test includes the use of a number of bottles or flasks sufficient to provide one for the testing of corrosion inhibitors in varying amounts, and one for comparison (a blank) for each of the corrosion inhibitors being tested. To cleaned and numbered one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about one hour to purge any oxygen present. After the purging was completed, the corrosive inhibitor being tested was added to each flask in amounts ranging from 10 to 50 p.p.m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measure of the effectiveness of the inhibitor compositions; thus, a protection percent may be calculated for each of the test strips taken from the inhibited test fluids in accordance with the following formula:

$$\frac{L1 - L2}{L1} \times 100$$

in which L1 is the loss in weight of strips taken from uninhibited test fluids, and L2 is the loss in weight of strips which were subjected to inhibited test fluids.

The results of tests carried out with the substituted triazine compounds of my invention are summarized in the table below. For each of the structures tested, identified as inhibitors Nos. 1 through 15, it is understood that the column headed "Amine" is the intermediate reaction product obtained by the reaction of the aniline and formaldehyde or more particularly the sym-hexahydro 1,3,5-triphenyl triazine structure. For example, the inhibitor identified No. 1 was prepared for test by reacting three mols of formaldehyde with three mols of aniline and thereafter reacting the intermediate product with two mols of PNS (propylated naphthalene sulfonic acid). Under "Percent Protection" two columns are provided for respective test results obtained when utilizing 25 and 50 p.p.m. respectively of the acidized triazine compounds.

Table

| Inhibitor No. | Amine | Acid | Mol Ratio | Percent Protection | |
|---|---|---|---|---|---|
| | | | | 25 p.p.m. | 50 p.p.m. |
| 1 a | Aniline | PNS | 3:3:2 | 32.0 | 85.9 |
| 2 | do | Oleic | 3:3:2 | 42.0 | 80.0 |
| 3 | $C_{12}$ Aniline | None | 3:3 | 89.1 | 96.2 |
| 4 | do | Oleic | 3:3:1 | 80.4, 81.1 | 92.8, 93.2 |
| 5 | do | do | 3:3:2 | 90.3 | 94.1 |
| 6 | do | do | 3:3:3 | 70.2, 72.3 | 87.4, 88.4 |
| 7 | do | Green Acids | 1:1:1 | 67.8 | 89.3 |
| 8 | do | do | 3:3:2 | 60.1 | 80.3 |
| 9 | do | do | 1:1:1 | 63.8 | 77.3 |
| 10 b | $C_5$ Aniline | None | 1:0:0 | 0 | 11.6 |
| 11 | do | do | 3:3 | 90.3 | 97.1 |
| 12 | do | Oleic | 3:3:2 | 81.7 | 93.8 |
| 13 | do | Green Acids | 3:3:2 | 74.3 | 90.1 |
| 14 | do | Stearic | 3:3:2 | 78.6 | 93.2 |
| 15 c | do | Ricinoleic | 3:3:2 | 92.1, 93.4 | 98.7, 99.1 | a The unmodified triazine gave no protection in the oil soluble test.
b This is the unmodified $C_5$ alkylaniline. The $C_{12}$ product gave no protection at 25 p.p.m., 22.8% at 50 p.p.m. Aniline gives negligible protection.
c Inhibitor 15 shows 76.1% protection at 10 p.p.m. and 41.0% at 5 p.p.m.

It will be evident from the foregoing table that corrosion may be effectively reduced to a value of one-tenth or less of that due to the natural flow of well fluids through the well tubing, pipe lines by incorporating in the well fluid comparatively small quantities of the substituted triazine-acid compounds.

In using my improved compositions for protecting the piping, casings, and other equipment which comes in contact with the corrosive fluids, I have found that excellent results may be obtained by injecting an appropriate quantity, generally not more than 100 p.p.m., of a selected corrosion inhibiting compound into a producing well so that it may mingle with the oil brine mixture and come into contact with the producing equipment. If desired, the inhibiting composition may be introduced directly into the top of the casing and be permitted to flow down into the well, and thence back through the tubing and into related apparatus. I have found that if this procedure is followed, substantial reduction in corrosion throughout the entire production and collecting system may be obtained.

The nature of the inhibiting action of my improved composition is not fully understood, but apparently the substituted triazine-acid compounds of this invention preferentially wet the surface of the metal equipment with oil, thus excluding the brine from contact with the metal. In any event, however, no matter what the mechanics of the corrosion inhibiting may be, they are extremely and surprisingly effective in protecting oil well and oil field equipment from corrosion, even when used in amounts of 50 p.p.m. or less, based on the oil content of the well fluid.

It is to be understood that the improved compositions of my invention are not limited to use alone and may be applied along with other agents commonly introduced in the producing oil wells for breaking emulsions, preventing scaled formation, minimizing pitting, etc. It is further evident that my invention is not restricted to the use of improved compositions for inhibiting corrosion in oil wells, but may be employed to perform this function in the presence of corrosive brines derived from other sources.

Having described my invention and illustrated it by way of specific examples, what I claim as new and useful is:

1. The process of preventing corrosion of ferrous metals when exposed to contact with acidic corrosive fluids containing varying amounts of hydrogen sulfide and carbon dioxide which comprises introducing into the corrosive fluids a small amount, sufficient to inhibit corrosion, of the reaction product obtained by first condensing three mols of an alkylaniline, the alkyl group of the aniline being substituted on the aniline nucleus and having from 1 to about 15 carbon atoms, with an equimolar amount of an aldehyde selected from the group consisting of formaldehyde and paraformaldehyde by heating the aniline and aldehyde compounds together in the presence of azeotrope-forming solvent, distilling water from the intermediate triazine reaction product and reacting the intermediate triazine reaction product with from one to three mols of an acid selected from the group consisting of oleic, stearic, ricinoleic, and green acids to form an alkyl substituted triazine salt.

2. The process according to claim 1 in which the acid is oleic acid.

3. The process according to claim 1 in which the acid is stearic acid.

4. The process according to claim 1 in which the acid is ricinoleic acid.

5. The process of preventing corrosion of ferrous metals when exposed to contact with acidic corrosive fluids containing varying amounts of hydrogen sulfide and carbon dioxide which comprises introducing into the corrosive fluids a small amount, sufficient to inhibit corrosion, of the condensation reaction product obtained by first heating together three mols of an alkyl substituted analine, said alkyl substituent being present on the aniline nucleus and having from 1 to about 15 carbon atoms with three mols of formaldehyde, said reaction being carried out in the presence of an azeotrope-forming solvent so as to effect removal of the water of condensation from the reaction mixture to provide an intermediate triazine reaction product after removal of the azeotrope solvent, which is thereafter reacted with from one to three mols of an acid selected from the group consisting of oleic, stearic, ricinoleic, and green acids to form an alkyl substituted triazine salt.

6. The process according to claim 5 in which the alkyl substituted aniline is $C_5$ analine and the acid is ricinoleic acid.

7. The process according to claim 5 in which the alkyl substituted aniline is $C_{12}$ aniline and the acid is oleic acid.

8. The process according to claim 5 in which the alkyl substituted aniline is $C_5$ aniline and the acid is stearic acid.

9. The process according to claim 5 in which the alkyl substituted aniline is $C_5$ aniline and the acid is oleic acid.

10. The process of preventing corrosion of ferrous metals when exposed to contact with acidic corrosive fluids containing varying amounts of hydrogen sulfide and carbon dioxide which comprises introducing into the corrosive fluids a small amount, sufficient to inhibit corrosion, of the condensation reaction product obtained by first heating together 3 mols of an alkyl substituted aniline, said alkyl substituent being present on the aniline nucleus and having from 1 to about 15 carbon atoms with 3 mols of paraformaldehyde, said reaction being carried out in the presence of an azeotrope forming solvent so as to effect removal of the water of condensation from the reaction mixture to provide an intermediate triazine reaction product after removal of the azeotrope solvent which is thereafter reacted with 3 mols of an acid selected from the group consisting of oleic, stearic, ricinoleic and green acids to form an alkyl substituted triazine salt.

11. The process of preventing corrosion as claimed in claim 10 wherein the selected acid is oleic acid.

12. The process of preventing corrosion as claimed in claim 10 wherein the selected acid is stearic acid.

13. The process of preventing corrosion as claimed in claim 10 wherein the selected acid is ricinoleic acid.

14. The process of preventing corrosion as claimed in claim 10 wherein the selected acid is green acid.

References Cited in the file of this patent

UNITED STATES PATENTS

| | | |
|---|---|---|
| 2,335,452 | Schelling | Nov. 30, 1943 |
| 2,466,517 | Blair et al. | Apr. 5, 1949 |
| 2,496,596 | Moyer et al. | Feb. 7, 1950 |